3,692,621
UNIVERSAL GRAPHIC DISPLAY MATERIAL
Everett Bryant Frech, Charlotte, N.C., assignor to Riegel Paper Corporation, New York, N.Y.
Continuation-in-part of application Ser. No. 738,780, June 21, 1968, now Patent No. 3,549,463. This application July 10, 1970, Ser. No. 53,986
The portion of the term of the patent subsequent to Dec. 22, 1987, has been disclaimed
Int. Cl. B32b *3/30;* B431 *1/12;* G03b *21/60*
U.S. Cl. 161—116                                    3 Claims

ABSTRACT OF THE DISCLOSURE

A durable graphic display material suitable for displaying written, projected, and three dimensional subject matter is disclosed. The new material includes an embossed polyvinyl fluoride film outer surface having a matte finish, bonded to a substrate layer of thermoplastic material. The new display material also includes a ferrous component for attracting and holding magnetized articles such as display markers used for illustrative purposes.

CROSS REFERENCE TO RELATED APPLICATION

This application is a continuation-in-part of application Ser. No. 738,780, filed June 21, 1968, now U.S. Pat. No. 3,549,463.

BACKGROUND OF THE INVENTION

Surfaces for the display of graphic information to an audience in the form of handwriting, optically projected images or supported three dimensional illustrative markers have been made in a wide variety of shapes and sizes and from many different materials. For the rapid display of chalk inscribed graphic information to an assembled group of people, the dark-colored slate "blackboard" has been very widely used for many years. For the projection of images onto a large surface for viewing by many people simultaneously, such as in the projection of photographic slides and motion pictures, various light-colored screens with glass beaded and lenticular surfaces are used. To display three dimensional markers in a vertical surface, magnetized boards have been employed in conjunction with ferrous markers, or vice versa.

In instructional applications, it is very common for a variety of graphic techniques to be alternatively and successively used. This usually requires the provision of a separate surface for use with each graphic technique. As will be appreciated, the provision of a plurality of different display surfaces is time and space consuming, as well as being relatively expensive compared to the of a universal surface for all of the aforementioned graphic applications. This invention provides an improved universal display material that may be used for either written, projected or three dimensional graphic illustration, or any combination thereof, if desired.

SUMMARY OF THE INVENTION

The new material of the invention provides a light-colored, preferably white, handwriting or drawing surface that is very durable, glare free and receptive of inked writing thereon. Additionally, the surface of the new material displays projected images, such as slides and movies, with clarity and sharpness. Moreover, the new and improved material of the invention includes a magnetizable component, for attracting and holding magnetized markers to its surface.

In accordance with the invention, the new graphic display material comprises a protective outer layer of a clear polyvinyl fluoride film. This outer film layer is laminated to a white or light-colored laminating grade thermoplastic substrate.

The polyvinyl fluoride surface of the new and improved laminate is very durable and should last indefinitely when used in the contemplated applications. The polyvinyl fluoride surface has very good writing and erasure characteristics, being particularly receptive of water based inks applied with felt pens. Water base inks can be easily erased from the surface of the new material, when desired, by the use of a damp cloth. Other writing materials, both temporary and permanent, can, of course, be used on the new display material.

In accordance with a significant aspect of the invention, the outer surface of the polyvinyl fluoride vinyl laminate is embossed to improve its writability, ink receptivity, and optical characteristics. The surface embossments provide a non-glare (matte) writing and projection surface which eliminates so-called optical "hot spots," which otherwise might be present on the flat display surface of the new material.

For maximum versatility, the polyvinyl fluoride-thermoplastic laminate of the invention further includes a ferrous component whereby magnetized markers may be retained on the surface thereof. The ferrous component is, most advantageously incorporated into the laminate in the form of a steel foil or wire screen bonded to a surface of the thermoplastic component, or can be incorporated in the thermoplastic layer by using for the thermoplastic layer a material known as "magnetic vinyl," as made available by Goodyear Chemical Company.

The new and improved display-projection material of the invention may be readily manufactured from discrete webs in roll form and the finished material may be either flexible or rigid. For its typical end uses, such as a projection screen for drive-in movies or in school classrooms, the new display material is bonded to a rigid support. To this end, the rear surface of the new material may also be provided with a layer of pressure sensitive adhesive to simplify its installation.

In accordance with another specific aspect of the invention, the polyvinyl fluoride film layer of the new material can be reverse printed on its non-exposed surface with a grid or other pattern which acts as a guide for writing on the polyvinyl fluoride surface. Advantageously, the grid pattern is faintly printed so that it is invisible when viewed for more than a few feet from the writing surface. The faint printing of the grid pattern provides the desired writing guide lines, yet does not act as a distraction to an audience or interfere with the travel of the writing implement over the surface.

DESCRIPTION OF PREFERRED EMBODIMENTS

In a highly advantageous form, the universal display material of the invention consists of a laminate structure having three principal layers bonded together with conventional adhesives.

The outer layer of the preferred new material is a thin transparent polyvinyl fluoride film, as made available on the filing date hereof from the E. I. du Pont Chemical Company of Wilmington, Del., under the trademark Tedlar. Advantageously, the polyvinyl fluoride film should be approximately ½ to 2 mils thick.

As a specific aspect of the invention, horizontal and/or vertical lines for guiding a writer are provided when the new material is used in place of a conventional slate "blackboard," for example. To accomplish this, a grid pattern is typically printed on the non-exposed surface of the polyvinyl fluoride film. To prevent the grid pattern from distracting the audience or obscuring what is written on the writing surface, the pattern should be faintly printed so that it is visible only to the writer (i.e., 2 to 3 feet from the writing surface).

Bonded to the outer film of polyvinyl fluoride and forming an intermediate stratum of the preferred laminate of the invention, is a layer of a white or light-colored laminating grade thermoplastic material. The thermoplastic layer has a white or comparable light-colored pigmentation in order to enhance its contrasting properties for projection applications and is preferably from 4 to 30 mils in thickness. Virtually any thermoplastic material that can be laminated to polyvinyl fluoride film, retains embossing, and has the required pigmentation could be used. For instance, styrene, acrylic, and acrylonirile butadiene styrene thermosplastics can be used as the substrate layer for the polyvinyl fluoride outer layer. However, it is preferred to utilize a vinyl plastic layer for the thermoplastic substrate.

The polyvinyl fluoride film layer is typically bonded to the thermoplastic layer with a suitable laminate chosen from the many available in the art. However, an adhesive formulated from Dupont number "49001" polyester resin and a polyisocyanate curing agent, such as the one available from E. I. du Pont Chemical under the designation "RC–805," has proven to be particularly advantageous when the thermoplastic layer is a vinyl plastic.

In accordance with the invention, the polyvinyl fluoride-thermoplastic sub-lamination of the invention is embossed in order to improve the optical properties and writing characteristics of the exposed polyvinyl fluoride surface. The embossed pattern can comprise either regular or irregular embossments. However, in accordance with a specific aspect of the invention, the pattern of embossments should be as fine as possible, i.e., the number of embodiments per lineal inch should be maximized. It has been found that the finer pattern of embossments, the easier it is to clean the surface with a damp cloth when written upon with water based inks. Apparently, this is due to the fact that the valleys between embossments of an open embossing pattern are deeper and the ink lodged therein is less accessible to the cleaning cloth than that in the shallower valleys of the finer embossing pattern.

In accordance with a specific aspect of the invention, it has been found that an embossing pattern, either regular or irregular, having more than about 80 embossments per lineal inch provides an easy to clean writing surface having the desired matte surface to reduce glare when the new material is used as a projection surface and a very pleasing appearance. The use of a more open embossing pattern, i.e., less than about 80 embossments per lineal inch, would, in addition to making it more difficult to remove ink from the surface, also result in a visible surface pattern which would detract from the pleasing appearance of the new material.

The polyvinyl fluoride-thermoplastic sub-lamination of the invention is advantageously provided with an iron or steel component for attracting and holding magnetized articles by joining the exposed thermoplastic surface with a thin flexible steel foil or wire screen by conventional laminating techniques. The bonding agent for effecting this combination may be any one of those known in the art for adhering thermo plastics to ferrous materials. Alternatively, the new and improved material of the invention may be provided with a ferrous component for magnetic attraction by utilizing a vinyl plastic layer containing ferrous particles. Such a material, known as Magnetic Vinyl, is available from the Goodyear Chemical Company.

The use of an iron or steel wire screen for the ferrous component is presently preferred. The mesh of the screen used should be fine, preferably having more than 40 wires per lineal inch. In order to prevent the pattern of the screen from telescoping through the thermoplastic and polyvinyl fluoride layers during the laminating or embossing steps, a firmer than usual thermoplastic stratum should be used. In accordance with the invention, it is undesirable for the surface pattern of any underlying layer, such as the grid pattern of a wire screen, to be visible on the polyvinyl fluoride face of the new graphic display material. Any telescoping of an underlying pattern through the polyvinyl fluoride surface would be highly undesirable since it would interfere with the attractive appearance and desired writing and projection characteristics of the new material.

In its end use as an "improved blackboard," for example, the polyvinyl fluoride-thermoplastic-ferrous component material of the invention is preferably mounted on a stiff particle board substrate to impart rigidity. Advantageously, to simplify the joining of the new and improved graphic display material of the invention to a rigid substrate, the mounting surface thereof may be provided with a coating of a suitable pressure sensitive adhesive. When so mounted, the new display projection material is very suitable for installation on the walls of school classrooms and for other relatively permanent installations. When found necessary or desirable, such as in non-permanent applications where easy mobility and convenient handling of the material are important, the new graphic display material of the invention may be used in its as-manufactured flexible condition.

The new material of the invention provides a unique combination of functions making it very advantageous for use in applications utilizing a variety of graphic techniques. In addition to providing an easily erased writing surface, the invention provides for embossing the display-projection surface of the new material to improve its optical and writing properties, as well as the printing of a faint grid pattern on the non-exposed surface of the transparent outer display surface, to provide writing guide lines. To permit the utilization of magnetic markers as an illustrative tool, the invention provides for an iron or steel component, usually in the form of steel foil, or wire screen to be incorporated into the new and improved material.

The embossing of the outer polyvinyl fluoride surface with at least 80 embossments per lineal inch provides as easily cleanable writing surface that has a matte finish to reduce glare when the material is used as a projection surface. When fine embossing is provided, the embossments are not visible to the naked eye and the surface has a very attractive appearance.

The new material permits the same surface to be used for writing, projection, and with illustrative three dimensional markers. It is foreseen that the new material will find wide acceptance in the educational industry where graphic versatility is desired.

It should be understood that the specific examples described in the preceding paragraphs are meant to be illustrative only. Variations may be made without departing from the clear teachings of the disclosure. Accordingly, reference should be made to the following appended claims in ascertaining the full scope of the invention.

I claim:
1. A universal graphic display material comprising
   (a) a light colored thermoplastic stratum,
   (b) a ferrous component whereby magnetized display pieces will be retained on the surface of said material, and
(c) a polyvinyl fluoride film layer bonded to a surface of said thermoplastic stratum,
(d) said polyvinyl fluoride layer having an embossed outer surface including at least about 80 embossments per lineal inch.

2. The display material of claim 1 wherein said embossments are arranged in a regular pattern.

3. A universal graphic display material comprising
(a) a light colored vinyl plastic stratum,
(b) a polyvinyl fluoride film layer bonded to one surface of said vinyl plastic stratum,
(c) a ferrous stratum bonded to the surface of said vinyl plastic stratum opposite said polyvinyl fluoride film,
(d) said polyvinyl fluoride layer having an embossed outer surface comprising at least about 80 embossments per lineal inch.

References Cited
UNITED STATES PATENTS

| | | | |
|---|---|---|---|
| 3,549,463 | 12/1970 | Frech | 161—2 |
| 3,264,164 | 8/1966 | Jerothe et al. | 161—33 |
| 3,250,173 | 5/1966 | Henry | 161—2 UX |

WILLIAM A. POWELL, Primary Examiner

U.S. Cl. X.R.

35—66; 40—136; 161—2, 3.5, 6, 167, 189, 218, 413; 350—128, 167